(12) United States Patent
Check et al.

(10) Patent No.: US 7,103,754 B2
(45) Date of Patent: Sep. 5, 2006

(54) COMPUTER INSTRUCTIONS FOR HAVING EXTENDED SIGNED DISPLACEMENT FIELDS FOR FINDING INSTRUCTION OPERANDS

(75) Inventors: Mark A. Check, Hopewell Junction, NY (US); Brian B. Moore, Poughkeepsie, NY (US); Timothy J. Slegel, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 10/403,417

(22) Filed: Mar. 28, 2003

(65) Prior Publication Data

US 2005/0278507 A1  Dec. 15, 2005

(51) Int. Cl.
*G06F 9/30* (2006.01)
(52) U.S. Cl. ...................... 712/210; 712/214
(58) Field of Classification Search ................. 712/210
See application file for complete search history.

(56) References Cited

U.S. PATENT DOCUMENTS

| | | | | |
|---|---|---|---|---|
| 4,432,053 A | 2/1984 | Gaither et al. | ............... | 364/200 |
| 4,578,530 A | 3/1986 | Zeidler | .................... | 189/22.09 |
| 5,307,502 A | 4/1994 | Watanabe et al. | ........... | 395/800 |
| 5,666,411 A | 9/1997 | McCarty | ........................ | 380/4 |
| 5,787,302 A | 7/1998 | Hampapuram et al. | | 395/800.24 |
| 6,014,735 A * | 1/2000 | Chennupaty et al. | ........ | 712/210 |
| 6,105,125 A * | 8/2000 | Nemirovsky et al. | ........ | 712/209 |
| 6,105,126 A | 8/2000 | Check et al. | ............... | 712/210 |
| 6,336,178 B1 | 1/2002 | Favor | ............................. | 717/5 |
| 2001/0029577 A1 | 10/2001 | Worell et al. | ................ | 712/210 |
| 2003/0028765 A1 | 2/2003 | Cromer et al. | ............... | 713/164 |

FOREIGN PATENT DOCUMENTS

| | | |
|---|---|---|
| EP | 0 206 653 A2 | 6/1986 |
| EP | 0 354 774 A2 | 8/1989 |
| EP | 0 725 511 A2 | 2/1995 |
| WO | WO 01/11818 A2 | 8/1999 |

OTHER PUBLICATIONS

Principles of Operation (submitted with IDS).*
Computer Organization & Design by David A. Patterson and John L. Hennessy.*
z/Architecture Principles of Operation, SA22-7832-00, section 5-2-5-7.
John P. Hays, "Computer Architecture and Organization", 2nd Edition 1988, pp. 52-54; 198-201.
"The Microarchitecture of the IBM eServer Z900 Processor", E. M. Schwart et al., IBM Journal of Research & Development, vol. 46, NO. 4/5 Jul./Sep. 2002, pp. 381-395.
Unpublished IBM Document Describing IBM Prior Art, pp. 1-15.
"IBM PCI Cryptographic Coprocessor CCA Basic Services Reference and Guide for IBM 4758 Models 002 and 023 with Release 2.40", Sep. 2001, http://www.zone-h.org/files/33/CCA_Basic_Services_240.pdf; pp. 1-1 through 2-18, 6-1 through 6-16; 7-1 thorugh 7-24; B-1 through B-42; F-1 through F4.
"CryptoManiac: A Fast Flexible Architecture for Secure Communication", Wu et al., 28th Annual International Symposium, on Computer Architecture, Jul. 2001.

* cited by examiner

*Primary Examiner*—Eddie Chan
*Assistant Examiner*—Brian Johnson
(74) *Attorney, Agent, or Firm*—Lynn L. Augspurger; John E. Campbell

(57) ABSTRACT

A computer architecture that provides the definition of a 20 bit signed displacement value used to form the operand storage address.

33 Claims, 4 Drawing Sheets

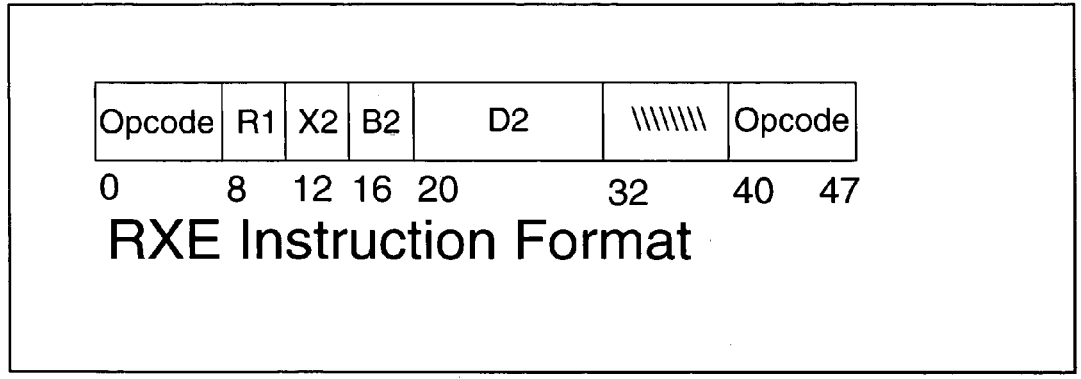
Figure 1: RXE Instruction Format
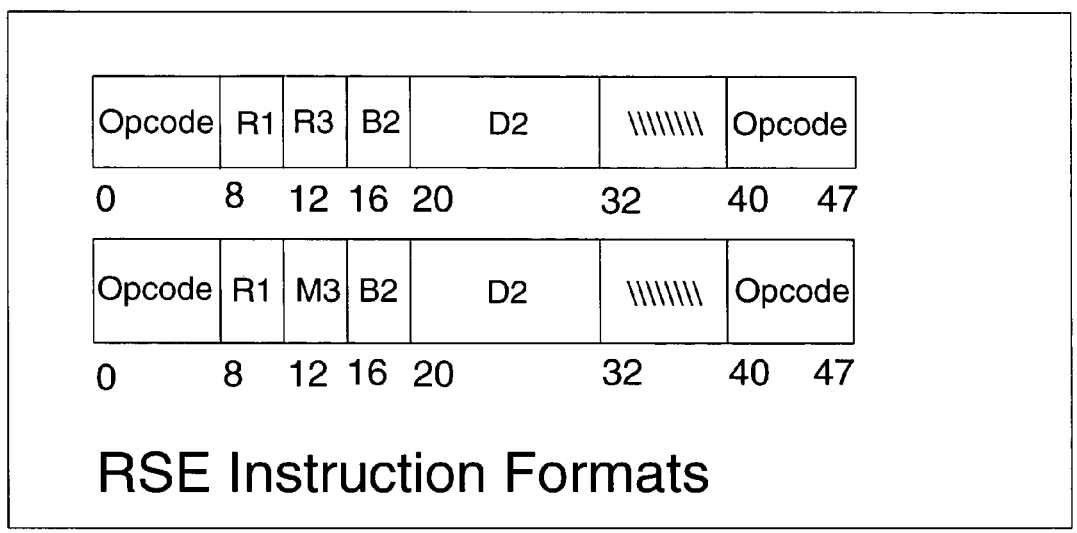
Figure 2: RSE Instruction Formats

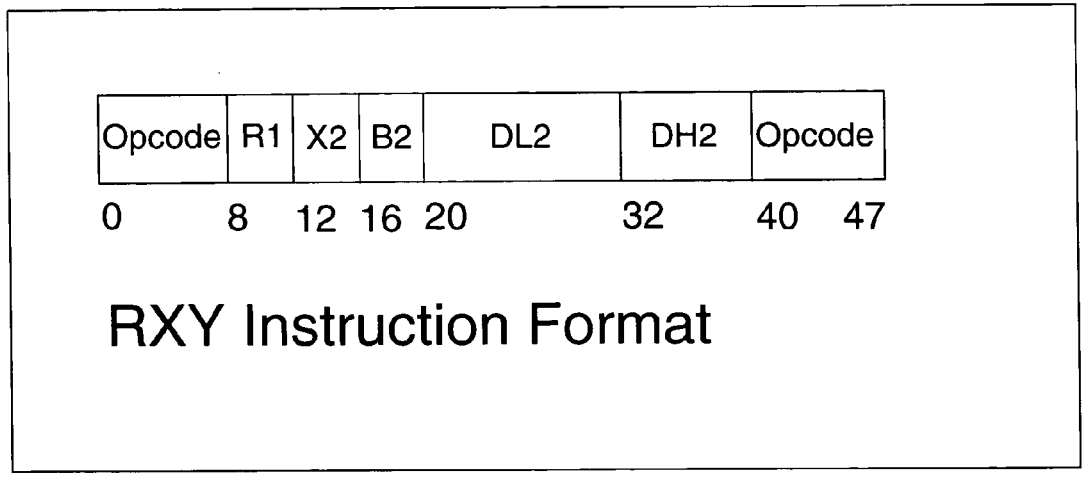
Figure 3: RXY Instruction Format
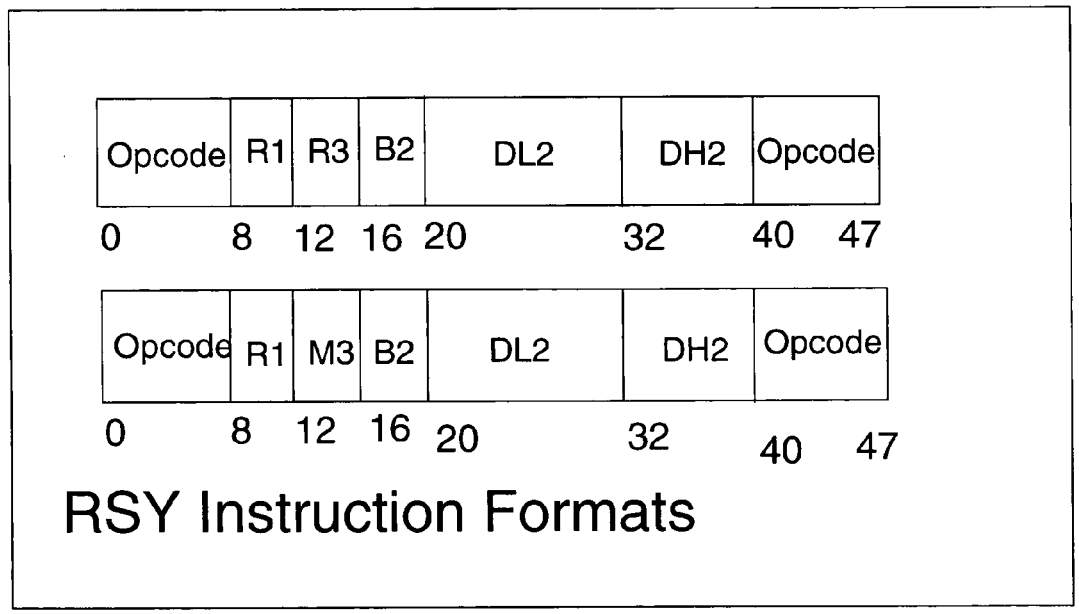
Figure 4: RSY Instruction Formats

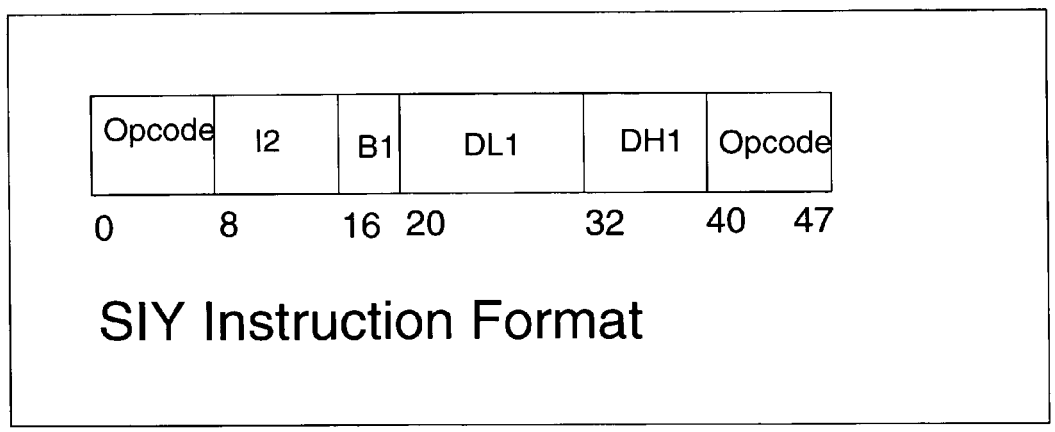
Figure 5: SIY Instruction Format

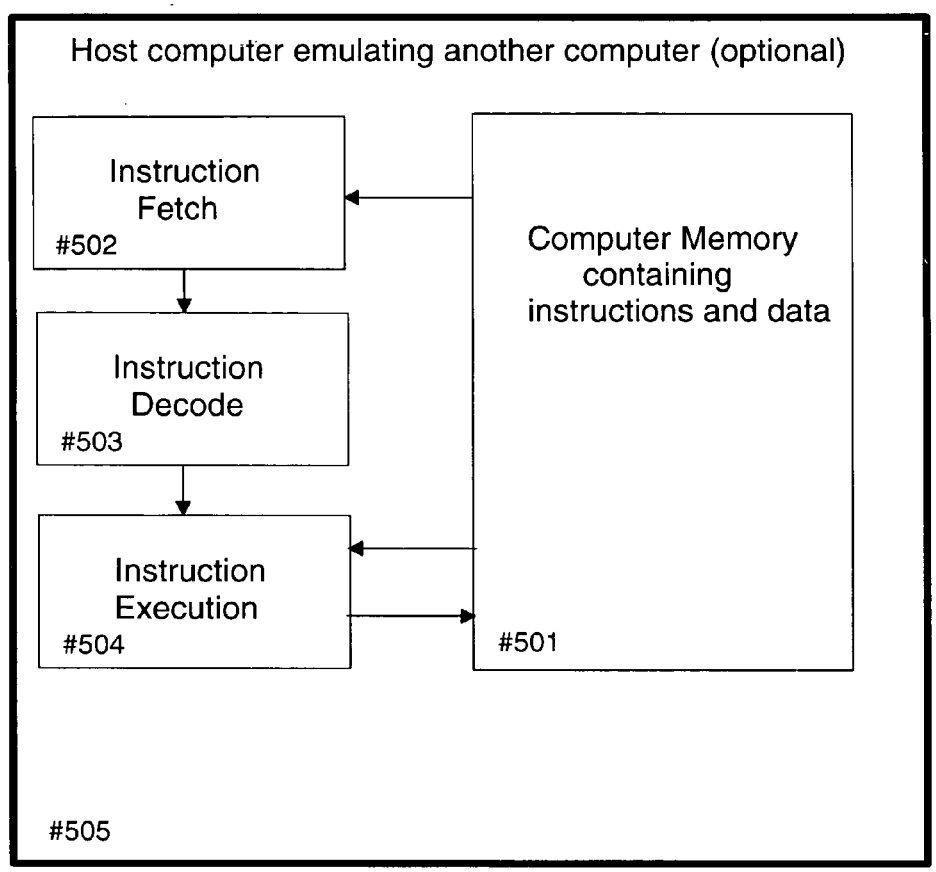
Figure 6: Computer System using Preferred Instruction Formats

COMPUTER INSTRUCTIONS FOR HAVING EXTENDED SIGNED DISPLACEMENT FIELDS FOR FINDING INSTRUCTION OPERANDS

FIELD OF THE INVENTION

This invention relates to computer systems, and particularly to a computer architecture having signed instructions for a long displacement facility for operand address formulation.

Trademarks: IBM® is a registered trademark of International Business Machines Corporation, Armonk, N.Y., U.S.A.. S/390, Z900 and z990 and other product names may be registered trademarks or product names of International Business Machines Corporation or other companies.

BACKGROUND

Before our invention there existed in the IBM z/Architecture (and its predecessor architectures) the existence of instruction formats having storage addressing in the form of base register plus 12 bit unsigned displacement or the form of base register plus index register plus 12 bit unsigned displacement, as incorporated in IBM's z900 mainframe servers. Generally, the computer architecture of the z900 was described in the IBM z/Architecture Principles of Operation, Publication SA22-7832-00, (incorporated herein by reference), where section 5–2 to 5–7 describes the Instructions consisting, of two major parts: an op code and the designation of the operands that participate. The instruction formats of these currently available machines are described beginning at 5–3. It will be noted that the basic instruction formats described at 5–4 and 5–5 include the RXE format described in detail also in our prior U.S. Pat. No. 6,105,126, granted Aug. 15, 2000, and entitled "Address Bit Decoding for same Adder Circuitry for RXE Instruction Format with SAME XBD location as RX Format and Disjointed Extended Operation Code."

SUMMARY OF THE INVENTION

In accordance with our preferred embodiment of our invention for use on both the prior IBM z900 Servers, but also on new processors which we name the z990 Servers, as well as on other computer systems which can emulate our new IBM Z/Architecture comprising of the existing Z/Architecture instructions and instruction formats and new instructions using several new long displacement instruction formats that provide for a new storage addressing that consists of either base register plus 20 bit signed displacement or base register plus index register plus 20 bit signed displacement. These new formats can be used to provide new instructions or can modify the operation of a subset of existing instructions that were created with only the prior 12 bit unsigned displacements for calculation of the storage address. The advantages achieved by the new computer architecture instruction formats is that they provide for a long displacement facility which can be achieved within an existing machine or a new machine which implements the new Z/Architecture with our new instruction formats.

DESCRIPTION OF THE DRAWINGS

FIG. 1 illustrates the existing Z/Architecture RXE instruction format; and

FIG. 2 illustrates the existing Z/Architecture RSE instruction format; and

FIG. 3 illustrates the new Z/Architecture RXY instruction format; and

FIG. 4 illustrates the new Z/Architecture RSY instruction format; and

FIG. 5 illustrates the new Z/Architecture SIY instruction format; and

FIG. 6, shows the preferred embodiment of a computer memory storage containing instructions in accordance with the preferred embodiment and data, as well as the mechanism for fetching, decoding and executing these instructions, either on a computer system employing these architected instructions or as used in emulation of our architected instructions.

Our detailed description explains the preferred embodiments of our invention, together with advantages and features, by way of example with reference to the drawings.

DETAILED DESCRIPTION OF THE INVENTION

In the current Z/Architecture there exist the RXE format as described in U.S. Pat. No. 6,105,126 (incorporated fully by reference) shown here and in that patent as FIG. 1, and also RSE, shown here as FIG. 2, instruction formats. There are existing instructions in the Z/Architecture which use the base register plus 12 unsigned displacement or base register plus index register plus 12 bit unsigned displacement to form the operand storage address.

In accordance with our preferred embodiment the invention creates three new formats RXY, FIG. 3, RSY, FIG. 4, and SIY, FIG. 5. These new formats are used to provide a 20 bit signed displacement field that can be used to form the operand storage address base register plus 20 bit signed displacement or base register plus index register plus 20 bit signed displacement. This new 20 bit signed displacement field can be used for support of new instructions or can allow prior instructions that only had a 12 bit unsigned displacement to now have access to a signed 20 bit signed displacement. It is a feature of our invention that any software code created under the prior instruction formats will operate as they were originally defined, with a 12 bit unsigned displacement, while especially, any new software code created under the new instruction formats can operate with the new 20 bit signed displacement (chosen as comprising signed long displacement bits numbering, in the preferred embodiment 20). The new 20 bit signed displacement is done as two parts that are adjacent to each other. The two parts of the displacement value while being located in adjacent fields in the instruction text are not sequentially numbered bit ranges. The DL1 or DL2 field in the instruction formats is the least significant 12 bits of the 20 bit signed displacement and are in the same location in the RXY, RSY, and SIY instruction formats as the 12 bit unsigned D2 field in the existing RXE and RSE formats. The DH1 or DH2 field in the RXY, RSY, or SIY instruction formats are defined as the 8 most significant bits of the 20 bit signed displacement field and is located in an undefined area of the RXE and RSE instruction formats. By reference to the Figures it will be appreciated that D1 and D2 refers to the displacement field for operand one and the displacement field for operand two of an instruction while, as DL is an acronym for "Displacement Low" while DH is an acronym for "Displacement High" for which it will be appreciated that DL1 and DH1 will refer to the displacement fields for operand one and DL2 and DH2 will refer to the displacement fields for operand two.

In FIG. 6, #501 shows a computer memory storage containing instructions and data. The long displacement instructions described in this invention would initially stored in this computer. #502 shows a mechanism for fetching instructions from a computer memory and may also contain local buffering of these instructions it has fetched. Then the raw instructions are transferred to an instruction decoder, #503, where it determines what type of instruction has been fetched. #504, shows a mechanism for executing instructions. This may include loading data into a register from memory, #501, storing data back to memory from a register, or performing some type of arithmetic or logical operation. This exact type of operation to be performed has been previously determined by the instruction decoder. The long displacement instructions described in this invention would be executed here. If the long displacement instructions are being executed natively on a computer system, then this diagram is complete as described above. However, if an instruction set architecture, containing long displacement instructions, is being emulated on another computer, the above process would be implemented in software on a host computer, #505. In this case, the above stated mechanisms would typically be implemented as one or more software subroutines within the emulator software. In both cases an instruction is fetched, decoded and executed.

More particularly, these architected instructions can be used with a computer architecture with existing instruction formats with a 12 bit unsigned displacement used to form the operand storage address and also one having additional instruction formats that provide a additional displacement bits, preferably 20 bits, which comprise an extended signed displacement used to form the operand storage address. These computer architected instructions comprise computer software, stored in a computer storage medium, for producing the code running of the processor utilizing the computer software, and comprising the instruction code for use by a compiler or emulator/interpreter which is stored in a computer storage medium 501, and wherein the first part of the instruction code comprises an operation code which specified the operation to be performed and a second part which designates the operands for that participate. The long displacement instructions permit additional addresses to be directly addressed with the use of the long displacement facility instruction.

In a commercial implementation of the long displacement facility computer architected instruction format the instructions are used by programmers, usually today "C" programmers. These instruction formats stored in the storage medium may be executed natively in a Z/Architecture IBM Server, or alternatively in machines executing other architectures. They can be emulated in the existing and in future IBM mainframe servers and on other machines of IBM (e.g. pSeries Servers and xSeries Servers). They can be executed in machines running Limum on a wide variety of machines using hardware manufactured by IBM, Intel, AMD, Sun Microsystems and others. Besides execution on that hardware under a Z/Architecture, Linux can be used as well as machines which use emulation by Hercules, UMX, FXI or Platform Solutions, where generally execution is in an emulation mode. In emulation mode the specific instruction being emulated is decoded, and a subroutine built to implement the individual instruction, as in a "C" subroutine or driver, or some other method of providing a driver for the specific hardware as is within the skill of those in the art after understanding the description of the preferred embodiment. Various software and hardware emulation patents including, but not limited to U.S. Pat. No. 5,551,013 for a "Multiprocessor for hardware emulation" of Beausoleil et al., and U.S. Pat. No. 6,009,261: Preprocessing of stored target routines for emulating incompatible instructions on a target processor" of Scalzi et al; and U.S. Pat. No. 5,574,873: Decoding guest instruction to directly access emulation routines that emulate the guest instructions, of Davidian et al; U.S. Pat. No. 6308255: Symmetrical multiprocessing bus and chipset used for coprocessor support allowing non-native code to run in a system, of Gorishek et al; and U.S. Pat. No. 6,463,582: Dynamic optimizing object code translator for architecture emulation and dynamic optimizing object code translation method of Lethin et al; and U.S. Pat. No. 5,790, 825: Method for emulating guest instructions on a host computer through dynamic recompilation of host instructions of Eric Traut; and many others, illustrate the a variety of known ways to achieve emulation of an instruction format architected for a different machine for a target machine available to those skilled in the art, as well as those commercial software techniques used by those referenced above.

In the preferred embodiment the existing instruction formats form the operand storage address by the summing of the base register and 12 bit unsigned displacement or the base register, the index register, and the 12 bit unsigned displacement and the new instruction formats form the operand storage address by the summing of the base register and the 20 bit signed displacement or the base register, the index register, and the 20 bit signed displacement.

As illustrated by FIG. 6, these instructions are executed in hardware by a processor or by emulation of said instruction set by software executing on a computer having a different native instruction set.

In accordance with the computer architecture of the preferred embodiment the displacement field is defined as being in two parts, the least significant part being 12 bits called the DL, DL1 for operand 1 or DL2 for operand 2, and the most significant part being 8 bits called the DH, DH1 for operand 1 or DH2 for operand 2.

Furthermore, the preferred computer architecture has an instruction format such that the opcode is in bit positions 0 through 7 and 40 through 47, a target register called R1 in bit positions 8 through 11, an index register called X2 in bit positions 12 through 15, a base register called B2 in bit positions 16 through 19, a displacement composed of two parts with the first part called DL2 in bit positions 20 through 31 and the second part called DH2 in bit positions 32 through 39.

This computer architecture has an instruction format such that the opcode is in bit positions 0 through 7 and 40 through 47, a target register called R1 in bit positions 8 through 11, an source register called R3 in bit positions 12 through 15, a base register called B2 in bit positions 16 through 19, a displacement composed of two parts with the first part called DL2 in bit positions 20 through 31 and the second part called DH2 in bit positions 32 through 39.

Furthermore, our computer architecture instructions having a long displacement facility has an instruction format such that the opcode is in bit positions 0 through 7 and 40 through 47, a target register called R1 in bit positions 8 through 11, a mask value called M3 in bit positions 12 through 15, a base register called B2 in bit positions 16 through 19, a displacement composed of two parts with the first part called DL2 in bit positions 20 through 31 and the second part called DH2 in bit positions 32 through 39.

As illustrated, our preferred computer architecture with its long displacement facility has an instruction format such that the opcode is in bit positions 0 through 7 and 40 through 47, an immediate value called I2 in bit positions 8 through 15, a base register called B2 in bit positions 16 through 19, a displacement composed of two parts with the first part called DL1 in bit positions 20 through 31 and the second part called DH1 in bit positions 32 through 39.

Our long displacement facility computer architecture operates effectively when using new instructions which are created that only use the instruction format with the new 20 bit unsigned displacement.

A specific embodiment of our computer architecture utilizes existing instructions which have the instruction formats that only have the 12 bit unsigned displacement and are now defined to be in the new instruction formats to have either the existing 12 bit unsigned displacement value when the high order 8 bits of the displacement, field DH, are all zero, or a 20 bit signed value when the high order 8 bits of the displacement, field DH, is non-zero.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for executing a machine instruction in a central processing unit, the method comprising the steps of:
   fetching a machine instruction for execution, the machine instruction being defined for computer execution according to a computer architecture, the machine instruction comprising an opcode field, an operand base address field and a displacement field containing a displacement value, the displacement field comprising any one of:
   1) an unsigned displacement field consisting of only an unsigned portion of a given magnitude, the unsigned portion comprising a most significant bit at one end and a least significant bit at the other end or
   2) a signed displacement field consisting of a signed portion contiguous with said unsigned portion, wherein said least significant bit of said unsigned portion is contiguous with said signed portion;
   obtaining an operand base address from a location specified by the operand base address field;
   determining if the displacement field is an unsigned displacement field or a signed displacement field;
   if the displacement field is an unsigned displacement field, arithmetically adding the magnitude of the unsigned portion to the operand base address to determine an address of an operand;
   if the displacement field is a signed displacement field, concatenating the signed portion with the most significant bit of said unsigned portion to form a signed displacement value wherein the signed portion is a high order portion of said signed displacement value and said unsigned portion is a low order portion of said signed displacement value and algebraically summing the signed displacement value and the operand base address to determine an address of an operand; and
   performing a function defined by the opcode field, wherein the function uses the operand at the determined address.

2. The method according to claim 1, wherein said step of obtaining an operand base address comprises the step of retrieving from the operand base address field a base address field value, the base address field value comprising the location in a storage of the operand base address, said method comprising the further steps of:
   determining a function to be executed based on the opcode field value, and wherein said step of performing a function defined by the opcode field comprises the steps of:
   determining if the operand is a source operand or a result operand;
   (a) if the operand is determined to be a source operand:
      (1) fetching the operand at the determined address;
      (2) executing the determined function to be executed on the fetched operand to determine a first result value of a first result operand; and
      (3) storing the first result value of the first result operand of the executing; and
   (b) if the operand is determined to be a result operand;
      (1) fetching a source operand;
      (2) executing the determined function to be executed on the fetched source operand to determine a second result value of the operand; and
      (3) storing at the determined address, the second result value of the operand of the executing step.

3. The method according to claim 1, wherein the displacement field consists of any one of 12 bits or 20 bits, wherein the signed portion consists of an 8 bit most significant portion and the unsigned portion consists of a 12 bit least significant portion.

4. The method according to claim 1, wherein the machine instruction comprises bit j of the signed portion contiguous with the unsigned portion wherein bit j is a sign bit indicating that the displacement value is any one of a positive displacement value or a negative displacement value.

5. The method according to claim 1, wherein the unsigned portion of the machine instruction occupies the same bit positions as an unsigned displacement field in machine instructions of the same architecture.

6. The method according to claim 1, wherein the machine instruction consists of 48 bits, wherein the opcode consists of bits 0–7 and 40–47, a first operand locating field consists of bits 8–11, a second operand locating field consists of bits 12–15, the base address field comprises bits 16–19, the unsigned portion of the displacement field comprises bits 20–31, and the signed portion of the signed displacement field consists of bits 32–39.

7. The method according to claim 1, wherein the machine instruction defined for the computer architecture is fetched and executed by a central processing unit of an alternate computer architecture, the method comprising the further steps of:
   interpreting the machine instruction to identify a predetermined software subroutine for emulating the operation of the machine instruction, the predetermined software subroutine comprising a plurality of instructions; and
   executing the predetermined software subroutine to perform steps of the method for executing the machine instruction.

8. The method according to claim 1, wherein the computer architecture is the IBM z/Architecture, wherein the machine instruction format consists of any one of RXY, RSY or SIY.

9. The method according to claim 1, wherein the machine instruction further comprises any one of a third operand field, a mask field or an index field.

10. The method according to claim 1, wherein the determined function to be executed further employs a value consisting of any one of an immediate field value of an immediate field of the machine instruction, a mask field value of the machine instruction or a general purpose register value obtained from a general purpose register location determined by a value of a register field of the machine instruction.

11. A computer program product for executing a machine instruction in a central processing unit, the computer program product comprising:
   a storage memory readable by a processing circuit and storing instructions for execution by the processing circuit for performing a method comprising:
   fetching a machine instruction for execution, the machine instruction being defined for computer execution according to a computer architecture, the machine instruction comprising an opcode field, an operand base address field and a displacement field containing a displacement value, the displacement field comprising any one of:
      1) an unsigned displacement field consisting of only an unsigned portion of a given magnitude, the unsigned portion comprising a most significant bit at one end and a least significant bit at the other end or
      1a signed displacement field consisting of a signed portion contiguous with said unsigned portion, wherein said least significant bit of said unsigned portion is contiguous with said signed portion;
   obtaining an operand base address from a location specified by the operand base address field;
   determining if the displacement field is an unsigned displacement field or a signed displacement field;
   if the displacement field is an unsigned displacement field, arithmetically adding the magnitude of the unsigned portion to the operand base address to determine an address of an operand;
   if the displacement field is a signed displacement field, concatenating the signed portion with the most significant bit of said unsigned portion to form a signed displacement value wherein the signed portion is a high order portion of said signed displacement value and said unsigned portion is a low order portion of said signed displacement value and algebraically summing the signed displacement value and the operand base address to determine an address of an operand; and
   performing a function defined by the opcode field, wherein the function uses the operand at the determined address.

12. The computer program product according to claim 11, wherein said step of obtaining an operand base address comprises the step of retrieving from the operand base address field a base address field value, the base address field value comprising the location in a storage of the operand base address, said method further comprising:
   determining a function to be executed based on the opcode field value, and wherein said step of performing a function defined by the opcode field comprises the steps of:
   determining if the operand is a source operand or a result operand:
      (a) if the operand is determined to be a source operand;
         (1) fetching the operand at the determined address;
         (2) executing the determined function to be executed on the fetched operand to determine a first result value of a first result operand; and
         (3) storing the first result value of the first result operand of the executing step; and
      (b) if the operand is determined to be a result operand;
         (1) fetching a source operand;
         (2) executing the determined function to be executed on the fetched source operand to determine a second result value of the operand; and
         (3) storing at the determined address, the second result value of the operand of the executing step.

13. The computer program product according to claim 11, wherein the unsigned portion consists of bits l through m, wherein further the signed portion consists of bits i through k of the signed displacement machine instruction, wherein bit k is a bit position of a least significant bit of the signed portion and wherein bit m is a bit position of a least significant bit of the unsigned portion.

14. The computer program product according to claim 11, wherein the machine instruction comprises bit j of the signed portion contiguous with the unsigned portion wherein bit j is a sign bit indicating that the displacement value is any one of a positive displacement value or a negative displacement value.

15. The computer program product according to claim 11, wherein the unsigned portion of the machine instruction occupies the same bit positions as an unsigned displacement field in machine instructions of the same architecture.

16. The computer program product according to claim 11, wherein the machine instruction consists of 48 bits, wherein the opcode
   consists of bits 0–7 and 40–47, a first operand locating field consists of bits 8–11, a second operand locating field consists of bits 12–15, the base address field comprises bits 16–19, the unsigned portion of the displacement field comprises bits 20–31, and the signed portion of the signed displacement field consists of bits 32–39.

17. The computer program product according to claim 11, wherein the machine instruction defined for the computer architecture is fetched and executed by a central processing unit of an alternate computer architecture, the method comprising the further steps of:
   interpreting the machine instruction to identify a predetermined software subroutine for emulating the operation of the machine instruction, the predetermined software subroutine comprising a plurality of instructions; and
   executing the predetermined software subroutine to perform steps of the method for executing the machine instruction.

18. The computer program product according to claim 11, wherein the computer architecture is the IBM z/Architecture, wherein the machine instruction format consists of any one of RXY, RSY or SIY.

19. The computer program product according to claim 11, wherein the machine instruction further comprises any one of a third operand field, a mask field or an index field.

20. The computer program product according to claim 11, wherein the determined function to be executed further employs a value consisting of any one of an immediate field value of an immediate field of the machine instruction, a mask field value of the machine instruction or a general purpose register value obtained from a general purpose register location determined by a value of a register field of the machine instruction.

21. A system for executing a machine instruction in a central processing unit, the system comprising:
   a memory;
   a computer system in communication with the memory, the computer system comprising an instruction fetching unit for fetching instructions from memory and one or more execution units for executing fetched instructions;

wherein the computer system includes instructions to execute a method comprising:

fetching a machine instruction for execution, the machine instruction being defined for computer execution according to a computer architecture, the machine instruction comprising an opcode field, an operand base address field and a displacement field containing a displacement value, the displacement field comprising any one of:

1) an unsigned displacement field consisting of only an unsigned portion of a given magnitude, the unsigned portion comprising a most significant bit at one end and a least significant bit at the other end or 2) a signed displacement field consisting of a signed portion contiguous with said unsigned portion, wherein said least significant bit of said unsigned portion is contiguous with said signed portion;

obtaining an operand base address from a location specified by the operand base address field;

determining if the displacement field is an unsigned displacement field or a signed displacement field;

if the displacement field is an unsigned displacement field, arithmetically adding the magnitude of the unsigned portion to the operand base address to determine an address of an operand;

if the displacement field is a signed displacement field, concatenating the signed portion with the most significant bit of said unsigned portion to form a signed displacement value and algebraically summing the signed displacement value wherein the signed portion is a high order portion of said signed displacement value and said unsigned portion is a low order portion of said signed displacement value and algebraically summing the signed displacement value and the operand base address to determine an address of an operand; and performing a function defined by the opcode field, wherein the function uses the operand at the determined address.

22. The system according to claim 21, wherein said step of obtaining an operand base address comprises the step of retrieving from the operand base address field a base address field value, the base address field value comprising the location in a storage of the operand base address, said method further comprising:

determining a function to be executed based on the opcode field value, and wherein said step of performing a function defined by the opcode field comprises the steps of:

determining if the operand is a source operand or a result operand;

(a) if the operand is determined to be a source operand:
  (1) fetching the operand at the determined address;
  (2) executing the determined function to be executed on the fetched operand to determine a first result value of a first result operand; and
  (3) storing the first result value of the first result operand of the executing step; and (b) if the operand is determined to be a result operand:
  (1) fetching a source operand;
  (2) executing the determined function to be executed on the fetched source operand to determine a second result value of the operand; and
  (3) storing at the determined address, the second result value of the operand of the executing step.

23. The system according to claim 21, wherein the displacement field consists of any one of 12 bits or 20 bits, wherein the signed portion consists of an 8 bit most significant portion and the unsigned portion consists of a 12 bit least significant portion.

24. The system according to claim 21, wherein the machine instruction comprises bit j of the signed portion contiguous with the unsigned portion wherein bit j is a sign bit indicating that the displacement value is any one of a positive displacement value or a negative displacement value.

25. The system according to claim 21, wherein the unsigned portion of the machine instruction occupies the same bit positions as an unsigned displacement field in machine instructions of the same architecture.

26. The system according to claim 21, wherein the machine instruction consists of 48 bits, wherein the opcode consists of bits 0–7 and 40–47, a first operand locating field consists of bits 8–11, a second operand locating field consists of bits 12–15, the base address field comprises bits 16–19, the unsigned portion of the displacement field comprises bits 20–31, and the signed portion of the signed displacement field consists of bits 32–39.

27. The system according to claim 21, wherein the machine instruction defined for the computer architecture is fetched and executed by a central processing unit of an alternate computer architecture, the method comprising the further steps of:

interpreting the machine instruction to identify a predetermined software subroutine for emulating the operation of the machine instruction, the predetermined software subroutine comprising a plurality of instructions; and executing the predetermined software subroutine to perform steps of the method for executing the signed displacement machine instruction.

28. The system according to claim 21, wherein the computer architecture is the IBM z/Architecture, wherein the machine instruction format consists of any one of RXY, RSY or SIY.

29. The system according to claim 21, wherein the machine instruction further comprises any one of a third operand field, a mask field or an index field.

30. The system according to claim 21, wherein the determined function to be executed further employs a value consisting of any one of an immediate field value of an immediate field of the machine instruction, a mask field value of the machine instruction or a general purpose register value obtained from a general purpose register location determined by a value of a register field of the machine instruction.

31. The system according to claim 1, wherein the determining if the displacement field is an unsigned displacement field or a signed displacement field step comprises decoding the opcode field of the machine instruction.

32. The program product according to claim 11, wherein the determining if the displacement field is an unsigned displacement field or a signed displacement field step comprises decoding the opcode field of the machine instruction.

33. The system according to claim 21, wherein the determining if the displacement field is an unsigned displacement field or a signed displacement field step comprises decoding the opcode field of the machine instruction.

* * * * *

UNITED STATES PATENT AND TRADEMARK OFFICE
CERTIFICATE OF CORRECTION

PATENT NO. : 7,103,754 B2 Page 1 of 1
APPLICATION NO. : 10/403417
DATED : September 5, 2006
INVENTOR(S) : Mark A. Check et al.

It is certified that error appears in the above-identified patent and that said Letters Patent is hereby corrected as shown below:

Claims:

Claim 1:
Column 6, Line 8, after the word "executing" insert --step--

Claim 11:
Column 7, Line 18, delete "1a" and insert --2) a --

Claim 13:
Delete entire claim 13 and insert --13. The computer program product according to claim 11, wherein the displacement field consists of any one of 12 bits or 20 bits, wherein the signed portion consists of an 8 bit most significant portion and the unsigned portion consists of a 12 bit least significant portion.--

Claim 21:
Column 9, Line 29, after the word "value" delete "and algebraically summing the signed displacement value"

Signed and Sealed this

Twenty-eighth Day of November, 2006

JON W. DUDAS
*Director of the United States Patent and Trademark Office*